United States Patent [19]

Tsuzuki et al.

[11] Patent Number: 5,172,724
[45] Date of Patent: Dec. 22, 1992

[54] ELECTROMAGNETIC VALVE ASSEMBLY

[75] Inventors: Tetsuaki Tsuzuki; Michiharu Nishii; Masahiro Inden, all of Aichi, Japan

[73] Assignee: Aisin Seiki K.K., Kariya City, Japan

[21] Appl. No.: 676,490

[22] Filed: Mar. 28, 1991

[30] Foreign Application Priority Data

Mar. 31, 1990 [JP] Japan .................. 2-34294[U]

[51] Int. Cl.⁵ .............................................. F16K 15/00
[52] U.S. Cl. ............................... 137/614.2; 137/513.3
[58] Field of Search ................ 137/614.2, 513.3, 513.5

[56] References Cited

U.S. PATENT DOCUMENTS 3,111,138 11/1963 Humphreys et al. ........ 137/513.5 X
3,653,588 4/1972 Dreibelbis .................... 137/513.3 X
4,152,030 5/1979 Blomberg et al. ........... 137/513.3 X Primary Examiner—Martin P. Schwadron
Assistant Examiner—Kevin L. Lee
Attorney, Agent, or Firm—Sughrue, Mion, Zinn, Macpeak & Seas

[57] ABSTRACT

An electromagnetic valve of the present invention includes a housing 11,13, a fluid passage 12 provided in the housing 11,13, a valve member 18,21 for opening and closing the fluid passage 12, and a one way valve 25 having a valve member 26 and a valve seat 19b. The one way valve 25 is provided at one end of the fluid passage 12. The one way valve 25 is installed integrally within the housing 11,13 to facilitate installation in a small space.

1 Claim, 2 Drawing Sheets

ELECTROMAGNETIC VALVE ASSEMBLY

BACKGROUND OF THE INVENTION

The present invention relates to an electromagnetic valve for controlling a fluid flow in response to an electric signal.

A conventional electromagnetic valve 100 is in FIG. 3 and comprises a housing 1, a fluid passage 2 provided in the housing 1, a valve member 3 for opening and closing the fluid passage 2, an external passage 4 connected to one open end of the fluid passage 2, a one way valve 5 interconnected in the external passage 4, and an orifice member 6 provided in parallel to the one way valve 5.

However, since the one way valve 5 is provided separately from the housing 1, the conventional electromagnetic valve 100 is expensive due to many parts and also requires a large space for the installation of the valves 100, 5.

SUMMARY OF THE INVENTION

Accordingly, one of the objects of the present invention is to obviate the above drawbacks associated with the conventional valve.

A further object of the present invention is to reduce the number of parts.

To achieve the above objectives, an electromagnetic valve according to the present invention comprises a housing, a fluid passage provided in the housing, a valve member for opening and closing the fluid passage, electromagnetic means for moving the valve member and a one way valve having a valve member and a valve seat, wherein the one way valve is provided at one end of the fluid passage.

According to the present invention, the one way valve is installed integrally in the housing. Therefore, the electromagnetic valve is easy to install in a small space, since no more space is required except for a space for installing the electromagnetic valve.

Preferably, the valve seat of the electromagnetic valve is provided at the open end of the fluid passage. Thus, the number of parts can be reduced since the valve seat is integrally provided at the end of the fluid passage. Further, the electromagnetic valve can be produced more economically since the number of parts can be reduced.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
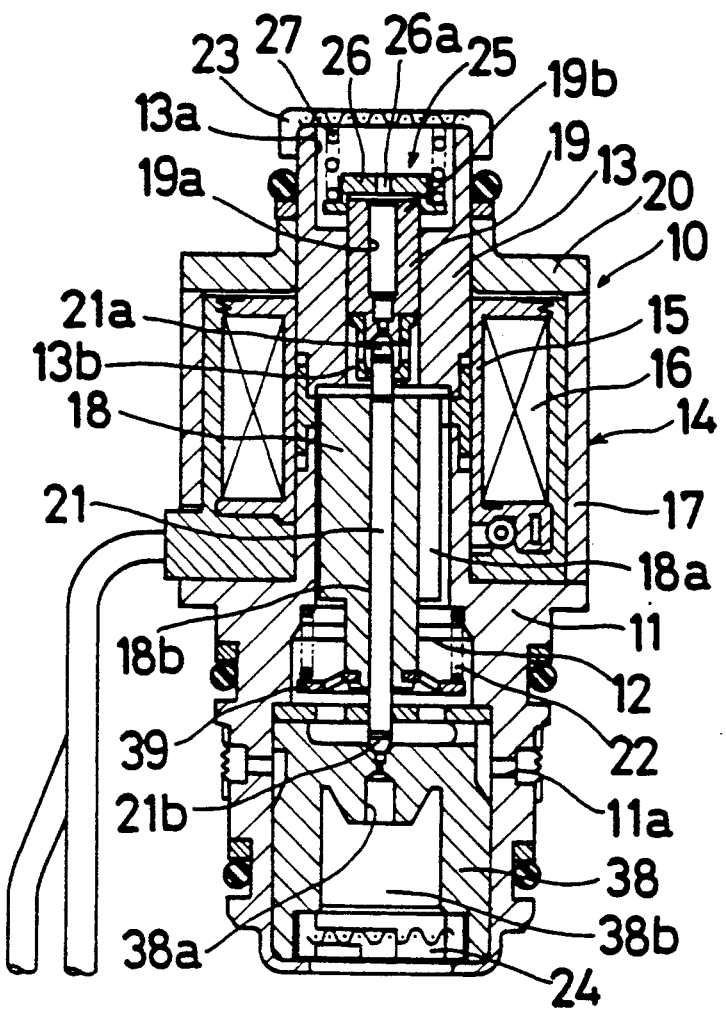
FIG. 1 is a cross sectional view showing an electromagnetic valve according to a first embodiment of the present invention.

Referring now to FIG. 1, an electromagnetic valve 10 has three ports 11a, 19a, 38a and two positions. The valve 10 includes a first housing 11 and a second housing 13. At an open end of the first housing 11, a filter 24 is fixed. At an open end of the second housing 13, a filter 23 is fixed. A fluid passage 12 extends in the first and the second housings 11, 13. An electromagnetic driving mechanism 14 is installed between the first and the second housings 11, 13. The electromagnetic driving mechanism 14 includes a bobbin 15 made from a resin, a coil 16 wound around the bobbin 15, an external yoke 17 surrounding the coil 16, a movable core 18 inserted into the fluid passage 12 and a yoke 20 fixed to the outer circumference of the second housing 13.

A first valve seat member 38 is pressed into the first housing 11. The first valve member 38 has a port 38a at the bottom of an internal bore 38b. A second valve seat member 19 is pressed into an internal bore 13b in the second housing 13. A port 19a is provided in the second valve seat member 19.

The movable core 18 has a central bore 18b on its axis. A rod 21 is inserted in the bore 18b. The rod 21 has two spherical valve members 21a, 21b at opposite ends. An axially extending slit 18a is provided on an outer circumference of the movable core 18. A retainer 39 is fixed to the movable core 18. A spring 22 is disposed between the first housing 11 and the retainer 39.

The spring 22 biases the valve member 21a away from the second valve seat member 19 and also biases the valve member 21b into contact with the first valve seat member 38 while the coil 16 is not energized. At this stage, the port 19a is connected to the port 11a through the slit 18a and the fluid passage 12, and the port 38a is closed.

When the coil 16 is energized, the movable core 18 is attracted toward the second housing 13. Then, the valve member 21a engages the second valve seat member 19 and the valve member 21b is separated from the first valve seat member 18. At this stage, the port 19a is closed and the port 38a is connected to the port 11a.

In this preferred embodiment, a valve mechanism 25 is provided in an enlarged bore 13a of the second housing 13. The valve mechanism 25 reduces the flow of a fluid from the port 19a to the fluid passage 12. However, the valve mechanism 25 allows the free flow of fluid from the port 19a to the outside of the electromagnetic valve 10. The valve mechanism 25 comprises a valve seat 19b provided around an open end of the port 19a, a hat-shaped valve member 26 having an orifice 26a at its center flattened portion and a spring 27 provided between the valve member 26 and the filter 23 and for pressing the valve member 26 toward the valve seat 19b.

In the above embodiment, the valve mechanism 25 is integrally installed in the electromagnetic valve 10 or is installed in the second housing 13. Therefore, the electromagnetic valve 10 with the valve mechanism 25 is easy to install in a small space, since no more space is required than the space for installing the electromagnetic valve 10.

Further, in the above embodiment, the valve seat 19b is provided at the open end of the fluid passage 12 or is provided at the open end of the second valve seat member 19. In addition, the valve member 26 has both a function of a one way valve and a function of a restricted orifice. Thus, the number of parts can be reduced and the electromagnetic valve 10 can be manufactured more economically.

Figure 2:
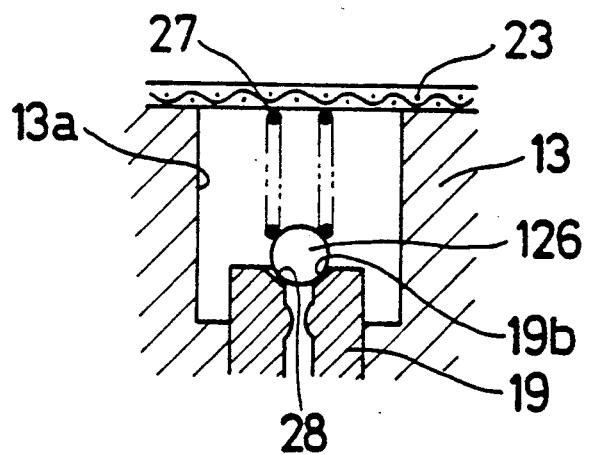
FIG. 2 is a partial cross sectional view showing an electromagnetic valve according to the embodiment of the present invention.
Figure 3:
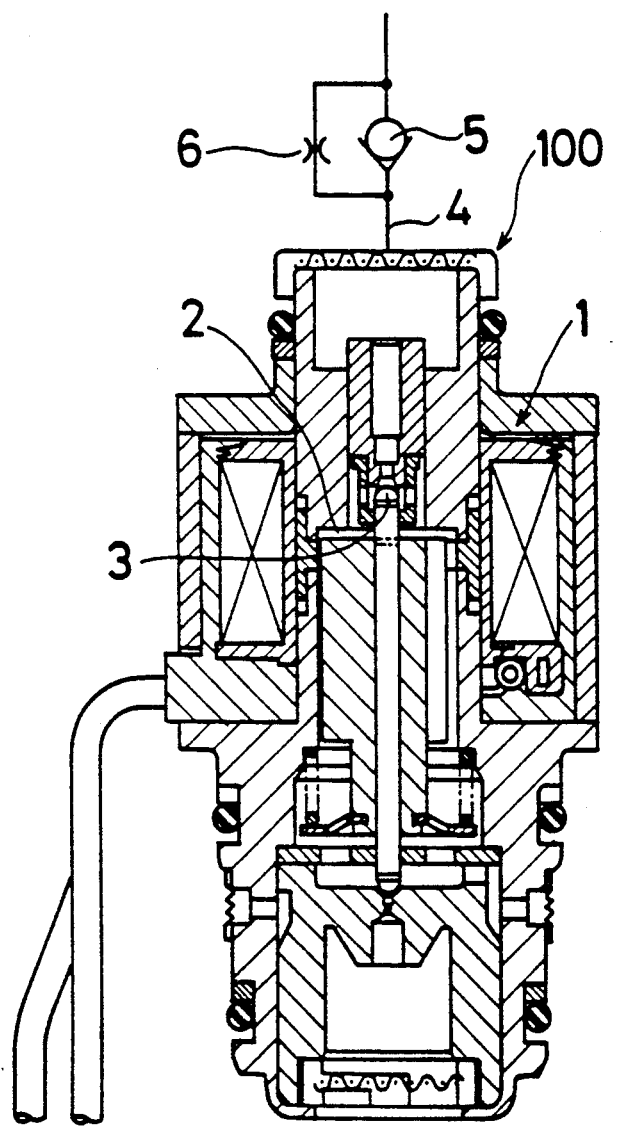
FIG. 3 is a cross sectional view showing a conventional electromagnetic valve.

Referring now to FIG. 2, a second preferred embodiment is explained. In this second embodiment, a ball valve 126 is installed in the enlarged bore portion 13a of the second housing 13. In the enlarged bore portion 13a, a valve seat 119b is provide at the open end of the second valve seat member 119. The ball valve 126 is pressed by the spring 127 toward the valve seat 119b. The valve seat 119b includes a restricted passage 128 for providing a restricted flow of fluid when said ball valve 126 is engaged with seat 119. The remaining configuration is the same as that of the first embodiment. Therefore, a detailed explanation is omitted by using the same numbers as the first embodiment for corresponding elements.

While the invention has been particularly shown and described with reference to preferred embodiments thereof, it will be understood by those in the art that the foregoing and other changes in form and details may be made therein without departing from the spirit and scope of the invention.

What is claimed is:

1. An electromagnetic valve assembly comprising:
    a housing having a bore extending therethrough with an enlarged bore portion at one end thereof;
    a valve seat member having a longitudinal axis secured in said bore in said housing with one end extending into said enlarged bore portion;
    a fluid passage extending through said valve seat member and communicating at one end with said enlarged bore portion;
    valve means disposed in said housing for engagement with said valve seat member for opening and closing said fluid passage at an opposite end of said fluid passage;
    electromagnetic means carried by said housing for moving said valve means;
    one way means located in said enlarged bore portion including a hat-shaped valve member adapted to fit over said one end of said valve seat member for engagement with a valve seat at said one end of said passage with said hat-shaped valve member having a restricted orifice extending therethrough in communication with said fluid passage; and
    spring means biasing said hat-shaped valve member axially into fitted engagement with said one end of said valve seat member thereby preventing radial movement of said hat-shaped valve member relative to said longitudinal axis of said valve seat member.

* * * * *

UNITED STATES PATENT AND TRADEMARK OFFICE
CERTIFICATE OF CORRECTION

PATENT NO. : 5,172,724

DATED : December 22, 1992

INVENTOR(S) : Tetsuaki TSUZUKI, Michiharu NISHII and Masahiro INDEN

It is certified that error appears in the above-identified patent and that said Letters Patent is hereby corrected as shown below:

Column 4, line 13, between "one way" and "means" insert
    -- valve --.

Signed and Sealed this

Twenty-sixth Day of October, 1993

Attest:

BRUCE LEHMAN

Attesting Officer

Commissioner of Patents and Trademarks